US011509651B2

(12) United States Patent
La Torre et al.

(10) Patent No.: US 11,509,651 B2
(45) Date of Patent: Nov. 22, 2022

(54) METHOD AND SYSTEM FOR SECURE AUTOMATIC LOGIN THROUGH A MOBILE DEVICE

(71) Applicant: TELECOM ITALIA S.p.A., Milan (IT)

(72) Inventors: Giuseppe La Torre, Catania (IT); Giovanni Torrisi, Catania (IT); Marco Cavallo, Syracuse (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

(21) Appl. No.: 17/051,557

(22) PCT Filed: Apr. 19, 2019

(86) PCT No.: PCT/EP2019/060222
§ 371 (c)(1),
(2) Date: Oct. 29, 2020

(87) PCT Pub. No.: WO2019/211110
PCT Pub. Date: Nov. 7, 2019

(65) Prior Publication Data
US 2021/0243184 A1    Aug. 5, 2021

(30) Foreign Application Priority Data
Apr. 30, 2018   (IT) .................. 102018000004972

(51) Int. Cl.
*G06F 21/00* (2013.01)
*H04L 9/40* (2022.01)
*G06F 8/61* (2018.01)

(52) U.S. Cl.
CPC ...... *H04L 63/0846* (2013.01); *H04L 63/0884* (2013.01); *H04L 63/102* (2013.01); *G06F 8/61* (2013.01)

(58) Field of Classification Search
CPC ............ H04L 63/0846; H04L 63/0884; H04L 63/102; H04L 63/18; H04L 63/083; G06F 8/61; H04W 12/06
See application file for complete search history.

(56) References Cited

U.S. PATENT DOCUMENTS

2011/0145899 A1* 6/2011 Cao ................. H04L 9/3226
  726/7
2011/0231920 A1* 9/2011 Asano ............. H04L 63/0815
  726/8

(Continued)

FOREIGN PATENT DOCUMENTS

WO    WO 2013/089777 A1    6/2013

OTHER PUBLICATIONS

International Search Report and Written Opinion dated Jul. 3, 2019 in PCT/EP2019/060222 filed on Apr. 19, 2019.

*Primary Examiner* — Kendall Dolly
(74) *Attorney, Agent, or Firm* — Oblon, McClelland, Maier & Neustadt, L.L.P.

(57) ABSTRACT

A method for authorizing automatic login of a user to a reserved area of an information resource includes, at a first user device, connecting to a web server for retrieving the information resource, and sending to an authentication server an identifier of the information resource and an identifier of the user. At the authentication server, based on the identifiers of the information resource and of the user, an authorization request is sent to a second user device associated with the user, and which stores access credentials for logging in the reserved area. At the second user device, the user is notified of the authorization request, and upon confirmation of the authorization request by the user on the second user device, access credentials are made available to (Continued)

Figure 1:
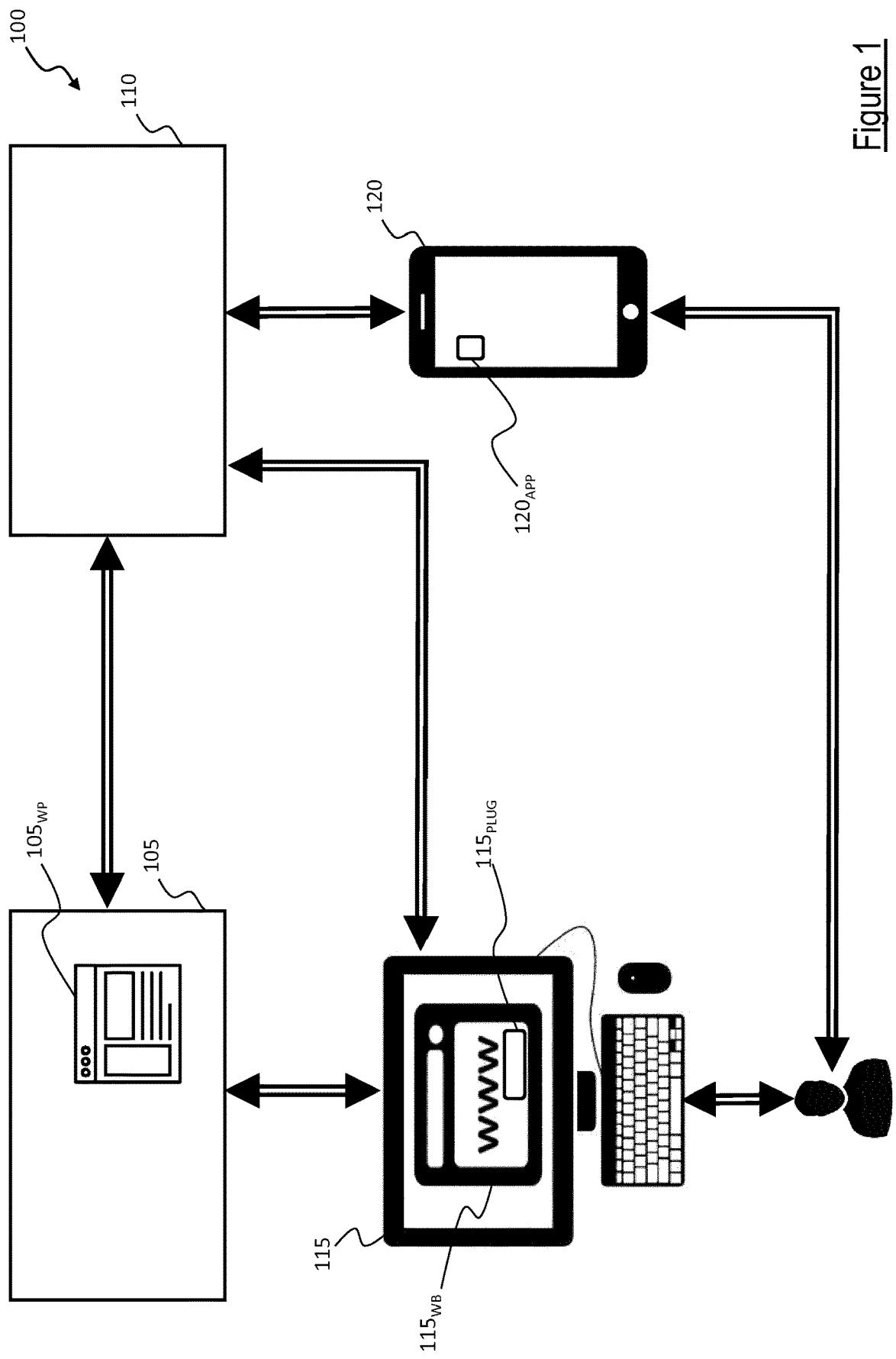

the web server. At the web server, automatic login to the reserved area is performed based on the access credentials.

11 Claims, 3 Drawing Sheets

(56) References Cited

U.S. PATENT DOCUMENTS

| | | |
|---|---|---|
| 2013/0262857 A1 | 10/2013 | Neuman et al. |
| 2013/0262858 A1 | 10/2013 | Neuman et al. |
| 2013/0263211 A1 | 10/2013 | Neuman et al. |
| 2014/0189808 A1* | 7/2014 | Mahaffey .............. H04L 63/083 |
| | | 726/4 |
| 2014/0317708 A1 | 10/2014 | Adrangi et al. |
| 2015/0237031 A1 | 8/2015 | Neuman et al. |
| 2015/0264050 A1 | 9/2015 | Neuman et al. |
| 2016/0197914 A1* | 7/2016 | Oberheide .......... H04L 63/0853 |
| | | 713/183 |
| 2016/0212113 A1* | 7/2016 | Banerjee ............. H04L 63/0853 |
| 2016/0294821 A1* | 10/2016 | Neuman ............... H04W 12/06 |

* cited by examiner

METHOD AND SYSTEM FOR SECURE AUTOMATIC LOGIN THROUGH A MOBILE DEVICE

BACKGROUND OF THE INVENTION

Field of the Invention

The present invention generally relates to a method and system for authorizing automatic login of a user to a restricted access area of an information resource (such as a web page) delivered by a web server.

Overview of the Related Art

The increasing number of internet services for users makes accurate protection of personal data increasingly important.

As the number of internet services increases, the number of access credentials, i.e. credentials (typically, username and password pairs) for accessing the internet services correspondingly increases.

Therefore, with the increasing number of internet services, each user has to choose, store and use a number of access credentials to access respective internet services. This could make user experience in using the internet services frustrating: in fact, whenever the user requests access to an internet service, for example a restricted access area of a web page, he/she must remember the access credentials and enter them manually.

In addition, in order to ensure adequate security of the access credentials, the access credentials (and, typically, the passwords) are requested to meet minimum criteria in terms of length, complexity and maximum duration, thus making user experience even more frustrating.

US20130111208 discloses techniques for authentication via a mobile device. A mobile device is pre-registered for website authentication services. A user encounters a website displaying an embedded code as an image alongside a normal login process for that website. The image is identified by the mobile device, encrypted and signed by the mobile device and sent to a proxy. The proxy authenticates the code and associates it with the website. Credentials for the user are provided to the website to automatically authenticate the user for access to the website bypassing the normal login process associated with the website.

WO201534384 discloses a method for authenticating a user via multiple user devices. The method includes forming, during access to a site, an association between a user and a first device. Contact information for a second device associated with the user is obtained. During a subsequent access to the site the first device is recognized. The user is prompted to authenticate without inputting identifying information. The user is authenticated at the site relying upon the association and a positively acknowledged message from the second device.

WO201550890 discloses a method for managing user credentials that enable access to secure websites. According to certain aspects, a browser device connects to a website server that hosts a secure website. The browser device initiates a credential request and enters a discovery routine with a mobile device. After establishing a secure channel with the mobile device, the browser device sends an identification of the secure website to the mobile device, which identifies corresponding user credentials and sends the user credentials to the browser device. The browser device populates a login page with the user credentials and accesses the secure website.

SUMMARY OF INVENTION

The Applicant has found that none of the solutions known in the art is satisfactory.

In particular, the Applicant has found that the solution disclosed in US20130111208 requires that the access credentials reside on a public server, which causes security issues.

The Applicant has further found that the solution disclosed in WO201534384 makes use of cookies to save the access credentials and identification of the second device, which can be subject to manipulation. Moreover, since the cookie is saved on a specific browser, any authentication request through another browser (or another device) would not allow the proposed authentication process to work properly.

The Applicant has also found that the solution disclosed in WO201550890 makes use of a form autofill mechanism that is not secure (because it is possible to trace the textual content of the fields by inspection of the web page) and has limited applications (in that it is not applicable in web pages which, for security reasons, continuously change the form fields identifier, thus making it impossible to compile it programmatically).

The applicant has faced the issue afflicting a user requesting access to a restricted access area of an information resource delivered by a web server, and particularly the issue that the user has to remember long, complex and low-duration access credentials to access the restricted access area, and has devised method and system for authorizing automatic login of the user to the restricted access area without that the user has to remember the access credentials.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for authorizing automatic login of a user to a restricted access area of an information resource delivered by a web server. The method comprises:

at a first user device, through a software application installed and running in the first user device, connecting to the web server for retrieving the information resource, and sending to an authentication server an identifier of the information resource and an identifier of the user;

at the authentication server, based on said identifier of the information resource and on said identifier of the user, sending to a second user device an authorization request for authorizing the automatic login, the second user device being associated with the user and storing access credentials for logging in said restricted access area of the information resource;

at the second user device, notifying to the user the authorization request, and upon confirmation of the authorization request by the user on the second user device, making available to the web server the access credentials stored in the second user device, and at the web server, performing the automatic login to the restricted access area of the information resource based on the access credentials made available by the second user device.

According to an embodiment of the present invention, said making available to the web server the access credentials stored in the second user device comprises:

at the second user device, sending the access credentials stored thereat to the authentication server, and at the authentication server, receiving the access credentials from the second user device and sending the received access credentials to the web server.

According to an embodiment of the present invention, the method further comprises:

at the first user device, through the software application, sending to the web server a provisional password identifying a login request to the restricted access area of the information resource, wherein said sending to an authentication server an identifier of the information resource and an identifier of the user comprises sending to the authentication server also said provisional password, and wherein said making available to the web server the access credentials comprises sending to the web server also said provisional password, said performing the automatic login to the restricted access area of the information resource being also based on said provisional password.

According to an embodiment of the present invention, said performing the automatic login to the restricted access area of the information resource is based on a matching between the provisional password received at the web server from the first user device and the provisional password received at the web server from the authentication server.

According to an embodiment of the present invention, the access credentials are encrypted access credentials. Said sending to the authentication server the access credentials preferably comprises sending to the authentication server the encrypted access credentials together with an encryption key shared between the second user device and the authentication server. Said sending the access credentials and the provisional password to the web server preferably comprises decrypting the encrypted access credentials and sending the decrypted access credentials and the provisional password to the web server.

According to an embodiment of the present invention, upon reception at the web server of the provisional password identifying the login request to the restricted access area of the information resource, the web server is configured to put the information resource on hold for a predetermined time period, waiting for receiving the access credentials, and preferably to make the information resource not available after said predetermined time period is elapsed without receiving the access credentials.

According to an embodiment of the present invention, the second user device comprises at least one mobile device, such as a smartphone, a tablet, a wearable smart device, adapted to run software applications. Said sending to a second user device an authorization request and said notifying to the user the authorization request are preferably carried out through an authorization software application installed in the mobile device and preferably associated with the information resource.

According to an embodiment of the present invention, the method further comprises registering the user to the authentication server.

According to an embodiment of the present invention, the method further comprises, at the second user device:

installing the authorization mobile application;

logging in to the authentication server through the authorization mobile application;

acquiring the access credentials, and storing the acquired access credentials in the second user device.

According to an embodiment of the present invention, the method further comprises, at the first user device:

installing a plugin software component associated with said software application;

logging in to the to the authentication server through said plugin software component and determining the identifier of the user, and storing in the plugin software component the identifier of the user;

The method further comprises, after said connecting to the web server for retrieving the information resource, running the plugin software component associated with said software application. Said sending to an authentication server an identifier of the information resource and an identifier of the user is preferably carried out through said plugin software component.

According to an embodiment of the present invention, said information resource comprises a piece of content on the World Wide Web identified by a Uniform Resource Identifier. Said identifier of the information resource preferably comprises said Uniform Resource Identifier.

According to an embodiment of the present invention, said Uniform Resource Identifier comprises a Uniform Resource Locator. Said identifier of the information resource preferably comprises said Uniform Resource Locator.

According to an embodiment of the present invention, said identifier of the information resource comprises a public key certificate, for example a Transport Layer Security certificate or a Secure Sockets Layer certificate, associated with said piece of content.

Another aspect of the present invention relates to a system for authorizing automatic login of a user to a restricted access area of an information resource. The system comprises:

a web server;

an authentication server;

a first user device configured to connect, through a software application installed and running in the first user device, to the web server for retrieving the information resource, and to send to the authentication server an identifier of the information resource and an identifier of the user;

a second user device associated with the user and storing access credentials for logging in said restricted access area of the information resource, wherein the authentication server is configured to send, based on said identifier of the information resource and on said identifier of the user, an authorization request to the second user device for authorizing the automatic login, wherein the second user device is configured to notify to the user the authorization request, and upon confirmation of the authorization request by the user on the second user device, to make available to the web server the access credentials stored in the second user device, and wherein the web server is configured to perform the automatic login to the restricted access area of the information resource based on the access credentials made available by the second user device.

BRIEF DESCRIPTION OF THE ANNEXED DRAWINGS

Figure 2A:
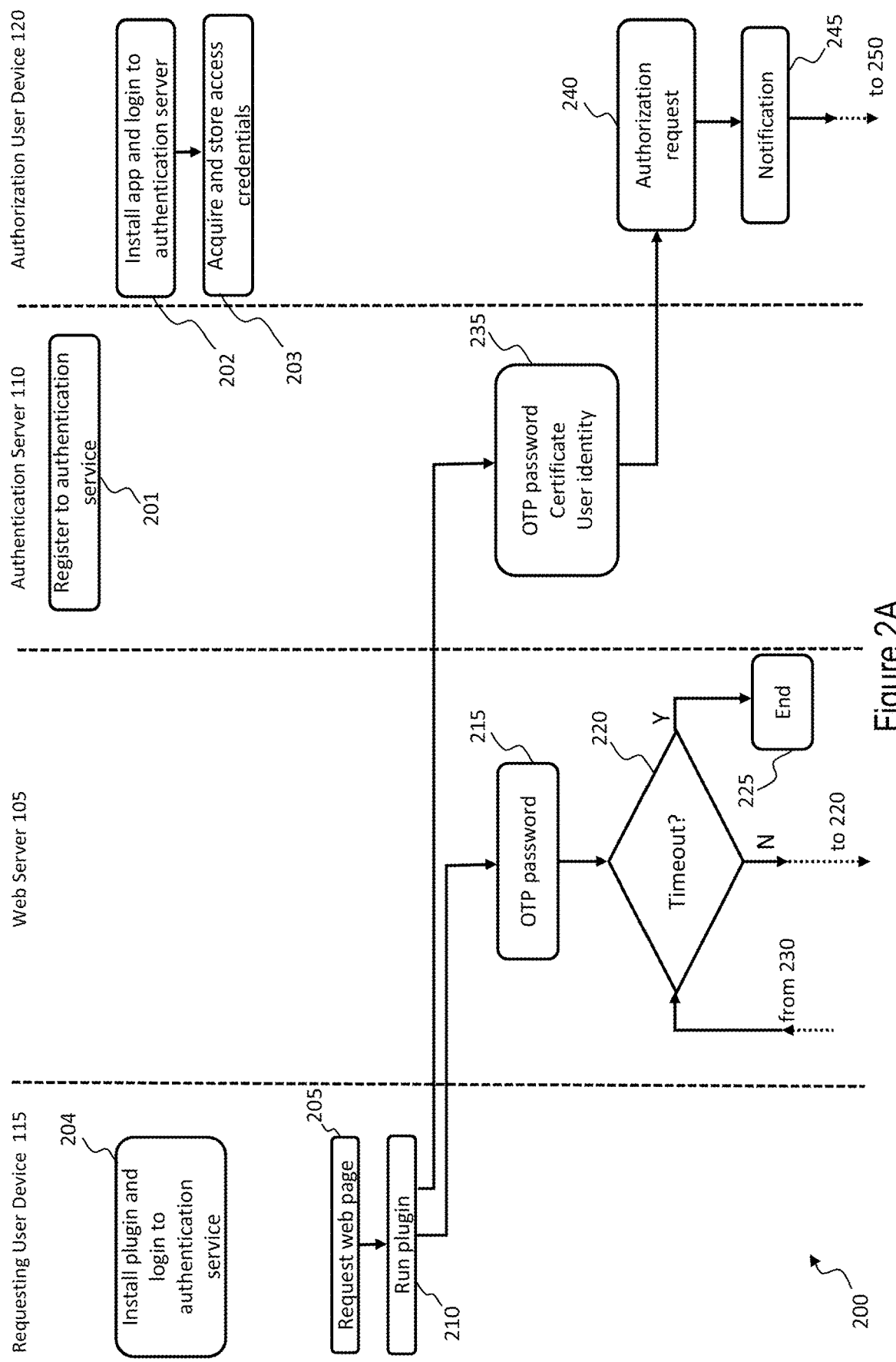
Figure 2B:
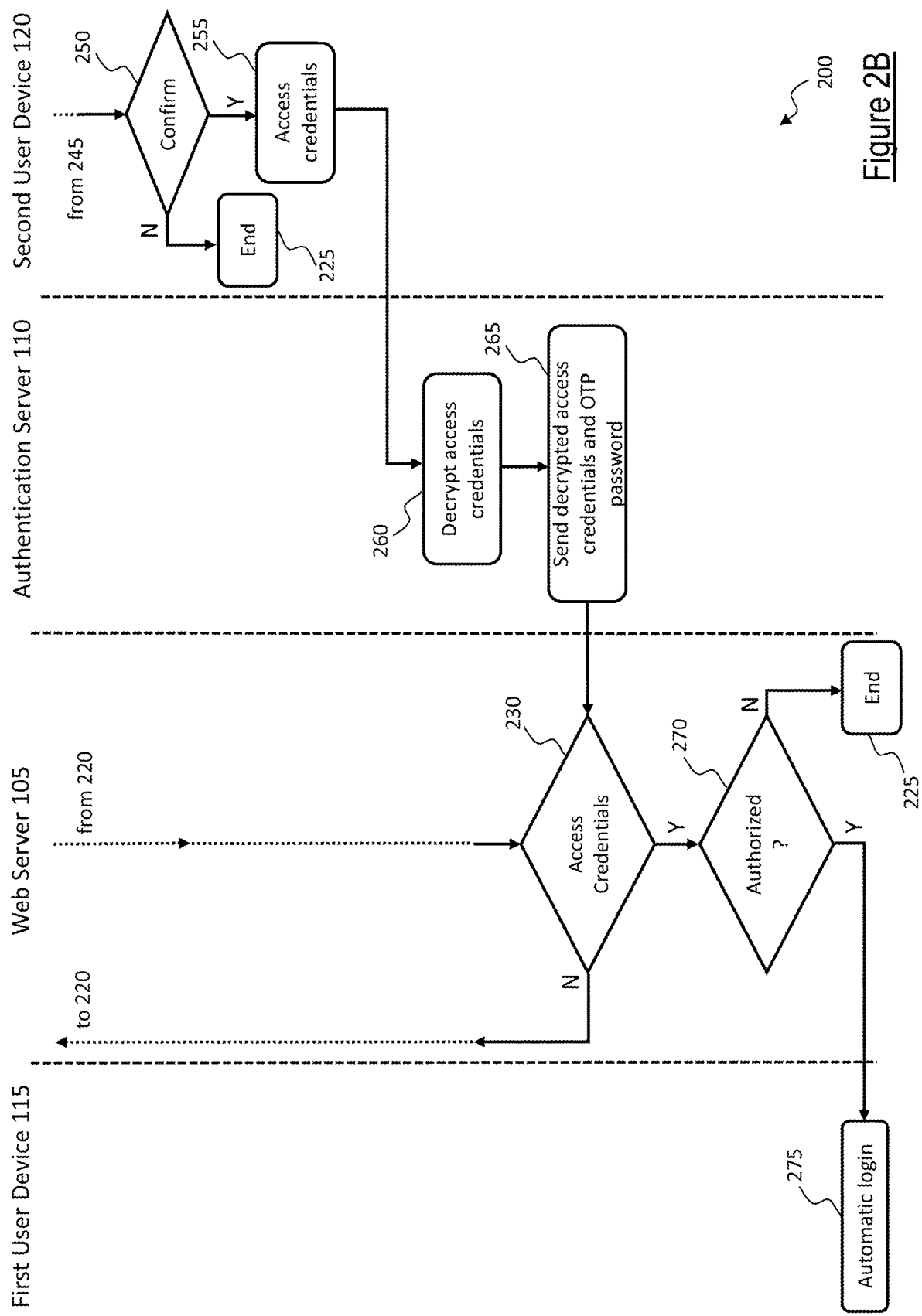

These and other features and advantages of the present invention will be made apparent by the following description of some exemplary and non-limitative embodiments thereof; for its better intelligibility, the following description should be read making reference to the attached drawings, wherein:

FIG. 1 shows a basic architecture of a system according to an embodiment of the present invention, FIG. 2A shows a first portion of a swimlane activity diagram of a procedure according to an embodiment of the present invention, and FIG. 2B shows a second portion of the swimlane activity diagram of the procedure according to the embodiment of the present invention.

DETAILED DESCRIPTION OF PREFERRED EMBODIMENTS OF THE INVENTION

FIG. 1 shows a system 100 according to an embodiment of the present invention. In the following, only (hardware and/or software) components of the system 100 that are relevant for the understanding of the present invention will be shown and discussed. For the sake of completeness, FIG. 1 also shows, by means of interaction arrows, the interactions between the components of the system 100 and between the components of the system 100 and a user of the system 100.

The system 100 comprises a web server 105 for storing, processing and delivering information resources to clients, for example by means of any suitable communication protocol, such as HTTP (Hypertext Transfer Protocol) protocol or, as herein exemplary assumed, HTTPS ("HTTP Secure") protocol. Broadly speaking, the HTTPS protocol is an adaptation of the HTTP protocol for secure communication over a computer network, in which the communication protocol is encrypted bidirectionally (i.e., between a client and a server) by Transport Layer Security (TLS), or formerly, its predecessor, Secure Sockets Layer (SSL), thus protecting against eavesdropping and tampering of the communication.

For the purposes of the present disclosure, an information resource may comprise web pages, images, videos or other pieces of content on the World Wide Web identified by a Uniform Resource Identifier (URI) such as a Uniform Resource Locator (URL). In the exemplary illustrated drawing, and as will be exemplary assumed from now on, the information resource delivered by the web server 105 comprises one or more a web pages, such as the web page $105_{WP}$.

As visible in the figure, the web server 105 preferably interacts with an authentication server (discussed here below) and with a requesting user device (discussed in the following).

The system 100 also comprises an authentication server 110 providing a network service (hereinafter authentication service) to authenticate access credentials (usually account names and passwords) of their users.

As visible in the figure, the authentication server 110 preferably interacts with the web server 105, with the requesting user device, and with an authorization user device (discussed in the following). As better discussed in the following, a first interaction between the requesting user device and the authentication server 110 or between the authorization user device and the authentication server 110 preferably takes place at a registration of the user to the authentication service (e.g., for setting a user account associated with the authentication service).

The system 100 further comprises a first user device 115. For the purposes of the present disclosure, the first user device 115 is the user device through which the user forwards a login request to access a desired reserved or restricted access area (or service), for example a restricted access area of the web page $105_{WP}$, therefore it will be referred to as requesting user device 115. The requesting user device 115 is preferably adapted to connect to the web server 105 and to the authentication server 110 via a communication network, which may for example be any wired or wireless communication network, or any number of wired or wireless communication networks operating in conjunction and based on same or different technologies.

The first user device 115 may for example be a desktop computer, a laptop computer or other computing device having processing, input/output and memory units adapted to run software applications installed therein. For the purposes of the present disclosure, web browser $115_{WB}$ will be considered as exemplary software application run by the first user device 115, the web browser retrieving, presenting and traversing or delivering information resources (such as the web page $105_{WP}$) to the user.

According to the present invention, a plugin software component (hereinafter, plugin component) $115_{PLUG}$ or other software application is installed in the web browser $115_{WB}$ for providing additional features to the web browser $115_{WB}$. Preferably, as described below, the plugin component $115_{PLUG}$ is run by the user at a proper phase of a procedure for authorizing automatic login of the user to a restricted access area of the information resource (for example, a restricted access area of the web page $105_{WP}$)— such a procedure, discussed in the following, will be referred to as authorization procedure. For the purposes of the present disclosure, the plugin component $115_{PLUG}$ is configured to retrieve an identifier of the user that is using the web browser $115_{WB}$, and, preferably, to retrieve an identifier of the information resource (for example the origin, e.g. the URL, of the web page $105_{WP}$ rendered by the web browser $115_{WB}$ at the time the user forwards the login request).

According to an embodiment of the present invention, a configuration of the plugin component $115_{PLUG}$ is requested, for example upon first installation of the plugin component $115_{PLUG}$ on the requesting user device 115. According to an embodiment of the present invention, as will be better discussed in the following, the configuration of the plugin component $115_{PLUG}$ takes place as follows: upon installation of the plugin component $115_{PLUG}$, the user is preferably requested to login to the authentication server 110 through the plugin component $115_{PLUG}$, so as to enable communication between the plugin component $115_{PLUG}$ and the authentication server 110; during a first communication between the plugin component $115_{PLUG}$ and the authentication server 110, the authentication server 110 preferably communicates to the plugin component $115_{PLUG}$ an identifier of the user that the authentication server 110 is expected to receive from the plugin component $115_{PLUG}$ when that user performs a login request (the identifier of the user comprising for example an account name of the user account associated with the authentication service, or a different identifier).

The system 100 also comprises a second user device 120. For the purposes of the present disclosure, the second user device 120 is the user device in which the access credentials are stored safely (for example in a cyphered manner), and through which the user authorizes automatic login to the restricted access area of the information resource (for example, the restricted access area of the web page $105_{WP}$), therefore it will be referred to as authorization user device 120.

The authorization user device 120 may for example be a personal digital assistant (PDA), a smartphone, a tablet, a wearable smart device (such as a smartwatch) or other mobile device having processing, input/output and memory units adapted to support different messaging protocols, such as Short Message Service (SMS) texting, push notifications and the like, as well as to run software applications (i.e. mobile applications in the example at issue of mobile device as second user device). As will be understood from the following discussion, the authorization user device 120 may comprise two or more of such mobile devices (for example, a smartphone/smartwatch pair).

For the purposes of the present disclosure, an authorization mobile application $120_{APP}$ will be considered as mobile application run by the authorization user device 120. Advantageously, the authorization mobile application $120_{APP}$ is configured to store the access credentials in the authorization user device 120 (for example in a memory location of the authentication user device 120 or in a subscriber identification module (SIM) thereof, preferably in a cyphered manner) and to communicate with the authentication server 110 (and, possibly, to send the stored access credentials to the authentication server 110 in case of successful authentication/authorization), as better discussed below. Communication between the authorization user device 120 (i.e., the authorization mobile application $120_{APP}$ installed therein) and the authentication server 110 preferably takes place via a communication network, which may for example be any wireless communication network, or any number of wireless communication networks operating in conjunction and based on same or different technologies. Examples of wireless communication networks are cellular networks such as 3G, 4G or LTE cellular networks. The use of cellular networks for the communication between the authentication server 110 and the authorization user device 120 is particularly advantageous in terms of data exchange security against fraudulent interception of data by third parties (in fact, as better discussed in the following, the communication between the authentication server 110 and the authorization user device 120 is used for transmission of the access credentials stored in the authorization user device 120).

According to an embodiment of the present invention, the access credentials are input by the user and acquired by the authorization mobile application $120_{APP}$ through a guided acquisition procedure. Preferably, the guided acquisition procedure takes place at a proper configuration of the authorization mobile application $120_{APP}$, for example upon first installation of the authorization mobile application $120_{APP}$ on the authorization user device 120. Upon acquisition of the access credentials, and preferably after the guided acquisition procedure, the acquired access credentials are stored (for example, in a cyphered manner) by the authorization mobile application $120_{APP}$ in the memory location of the authorization user device 120.

According to an embodiment of the present invention, as will be better discussed in the following, upon installation of the authorization mobile application $120_{APP}$, the user is preferably requested to login to the authentication server 110 through the authorization mobile application $120_{APP}$, so as to enable communication between the authorization mobile application $120_{APP}$ and the authentication server 110, and hence association between the authentication service and the authorization user device 120.

With reference now to FIGS. 2A and 2B, it shows a swim-lane activity diagram of the authorization procedure 200 according to an embodiment of the present invention. For the purposes of the present disclosure, the entities involved in the authorization procedure 200 are those represented in FIG. 1, namely the web server 105, the authentication server 110, the requesting user device 115 and the authorization user device 120.

Firstly, the registration to the authentication service takes place (action node 201). As mentioned above, considering, just as an example, the registration of the user to the service of automatic login to the restricted access area of the web page $105_{WP}$, the registration may for example comprise the definition of a user account associated with the authentication service. As mentioned above, the registration of the user to the authentication service may be performed either at the requesting user device 115 (for example, through the web page $105_{WP}$) or at the authentication user device 120 (for example, through the authentication mobile application $120_{APP}$).

Then, the configuration of the authorization mobile application $120_{APP}$ (action nodes 202-203) and the configuration of the plugin component $115_{PLUG}$ (action node 204) take place.

As mentioned above, the configuration of the authorization mobile application $120_{APP}$ preferably comprises installation of the authorization mobile application $120_{APP}$ on the authorization user device 120 and login to the authorization service through the authentication mobile application $120_{APP}$ (action node 202), and acquisition of the access credentials for logging in the restricted access area of the web page $105_{WP}$ and storage of the acquired access credentials in the memory location of the authorization user device 120 (action node 203), the acquisition and storage of the access credentials being preferably performed according to a guided procedure run by the authorization mobile application $120_{APP}$. According to embodiments of the present invention, the configurations of the authorization mobile application $120_{APP}$ may also be performed at any time after the installation of the authorization mobile application $120_{APP}$ (for example, when the user needs or desires to change the access credentials or other personal information and/or settings on the authorization mobile application $120_{APP}$). Additionally or alternatively, the registration at the authentication server 110 may be carried after installation of the authorization mobile application $120_{APP}$, for example by filling a registration form of the authorization mobile application $120_{APP}$.

As mentioned above, the configuration of the plugin component $115_{PLUG}$ preferably comprises installation of the plugin component $115_{PLUG}$ on the requesting user device 115 and login to the authentication service through the plugin component $115_{PLUG}$ (action node 204).

As should be understood, the configurations of the authorization mobile application $120_{APP}$ and of the plugin component $115_{PLUG}$ are not necessarily to be performed in the order illustrated and discussed.

Back to the authorization procedure 200, upon connection, through the web browser $115_{WB}$ installed and running in the requesting user device 115, to the web server 105 for requesting an information resource such as a web page $105_{WP}$ (action node 205), and upon rendering of the web page $105_{WP}$ by the web browser $115_{WB}$, the user requesting login to the restricted access area of the web page $105_{WP}$ preferably runs the plugin component $115_{PLUG}$ (action node 210)—however, plugin component $115_{PLUG}$ running may also be omitted in embodiments of the present invention in which no plugin component $105_{WP}$ is provided (for example, since the additional functionalities provided by it are also natively incorporated in the web browser $115_{WB}$).

The plugin component $115_{PLUG}$ (or the web browser $115_{WB}$ itself) is configured to send (action node 235) to the authentication server 110:

- an identifier of the web page $105_{WP}$. According to an embodiment of the present invention, the identifier of the web page $105_{WP}$ comprises a public key certificate (also known as a digital certificate or identity certificate), i.e. an electronic document used to prove the ownership of a public key, and comprising information about the public key, information about the identity of its owner, and the digital signature of an entity that has verified the certificate's contents In the example at issue in which the web server 105 delivers information resources to clients by means of HTTPS protocol, the public key certificate preferably comprises TLS or SSL certificates; and
- an identifier of the user. As mentioned above, according to an embodiment of the present invention, the identifier of the user may be communicated by the authentication server 110 to the plugin component $115_{PLUG}$ upon login to the authentication service through the plugin component $115_{PLUG}$ and subsequent first communication between the authentication server 110 and the plugin component $115_{PLUG}$ (the identifier of the user comprising for example an account name of the user account associated with the authentication service, or a different identifier).

Preferably, the plugin component $115_{PLUG}$ (or the web browser $115_{WB}$ itself) is configured to generate and send to the authentication server 110 (together with the identifier of the web page $105_{WP}$ and with the identifier of the user) also a provisional password identifying the login request to the restricted access area of the web page $105_{WP}$. The provisional password identifying the login request may for example be a one-time password (OTP), hereinafter OTP password, i.e. a password that is valid for only one login session or transaction. As will be better understood from the following discussion, the OTP password is used as example of a mechanism to match the login request and an authorization outcome (or, otherwise stated, to match or associate the login request in the web page $105_{WP}$ with the access credentials, in case of positive authorization outcome). However, embodiments of the present invention may also provide different matching mechanisms, or even no matching mechanism.

Preferably, the plugin component $115_{PLUG}$ (or the web browser $115_{WB}$ itself) is configured to send the OTP password (i.e., the same OTP password sent to the authentication server 110) also to the web server 105 (action node 215); as mentioned above, and as will be better explained in the following, the OTP password sent to both the web server 105 and to the authentication server 110 advantageously provides an association between the access credentials and the web page $105_{WP}$.

Upon reception of the OTP password, the web server 105 is preferably configured to put the web page $105_{WP}$ on hold, waiting for receiving the access credentials.

According to an embodiment of the present invention, the web page $105_{WP}$ is kept in hold for a predetermined time period (timeout) that is allowed to elapse before the web page $105_{WP}$ becomes not available, i.e. the web page $105_{WP}$ becomes not available after said predetermined time period is elapsed without receiving the access credentials. This is conceptually represented in the figure by decision nodes 220 and 230; particularly, the web page $105_{WP}$ is kept in hold as long as the predetermined time period from the reception of the OTP password at the web server 105 has not yet ended (exit branch N of the decision node 220), and as long as the access credentials or an indication of a negative authorization outcome are not received at the web server 105 (exit branch N of the decision node 230). Back to decision node 220, if (exit branch Y of the decision node 220) the predetermined time period from the reception of the OTP password at the web server 105 has ended without that the access credentials or the indication of the negative authorization outcome have been received at the web server 105, the authorization procedure 200 ends (action node 225) and the web page $105_{WP}$ becomes not available.

Back to the activity diagram 200 at authentication server 110 side, after receiving from the plugin component $115_{PLUG}$ (or the web browser $115_{WB}$) the identifier of the web page $105_{WP}$, the identifier of the user, and, preferably (as herein exemplary assumed), the OTP password (action node 235), the authentication server 110 forwards to the authorization mobile application $120_{APP}$ an authorization request for authorizing the automatic login (action node 240), which in turns notifies the authentication request to the authentication user device 120 (action node 245). Notification may for example be a push notification, for example a banner on the top the smartphone screen, a pop up bubble or badge from the button task bar, a dialog box that interrupts and blocks the view of the front running application, and may contain text and/or image message (possibly with the further playing of an alert sound to attract the attention of the user) indicative of the authentication request.

Upon being notified of the authentication request, the user may grant (confirm) or deny authorization to the automatic login (action node 250). Just as an example, authorization may be granted by touching on the notification or by means of other gesture (for example, by means of a sliding on the notification box), whereas authorization may be denied by performing no action on (i.e., by ignoring) the notification. Preferably, as herein assumed, authorization is considered granted if the gesture on the notification is performed within a prescribed time period, at the end of which the absence of actions on the notification is interpreted as authorization denied.

According to an embodiment of the present invention, the notification may be forwarded from the authorization user device 120 to a further authorization user device (not shown) associated the authorization user device 120 (in which case, authorization may be granted or denied by acting on the notification on said further authorization user device additionally or alternatively to acting on the notification on the authorization user device 120). Examples of authorization user device 120 and of the associated further authorization user device are smartphone/smartwatch pairs, tablet/smartphone pairs, tablet/smartwatch pairs and other combinations of mobile devices and/or wearable mobile devices.

If, exit branch N of the decision node 250, the user has not authorized the automatic login, then the authorization procedure 200 ends (action node 225); otherwise, exit branch Y of the decision node 250, it meaning that the user has authorized the automatic login (or, more generally, that the automatic login authorization has been successful), the authorization mobile application $120_{APP}$ retrieves and makes available to the web server 105 the access credentials stored in the authorization user device 120 (see action nodes 255, 260 and 265, discussed here below).

According to an embodiment of the present invention, said making available to the web server 105 the access credentials stored in the authorization user device 120 comprises, at the authorization user device 120, sending to the authentication server 110 the access credentials for accessing the restricted access area of the requested web page $105_{WP}$ (action node 255), and, at the authentication server 110, sending to the web server 105 (see action nodes 260 and 265) the access credentials (preferably, together with the OTP password, as discussed below). As should be understood, the provision of the access credentials and of the OTP password could be regarded per se as positive authorization outcome (in case of a negative authorization outcome, the indication of the negative authorization outcome instead of the access credentials is preferably sent from the authentication server 110 to the web server 105).

Preferably, the access credentials are sent from the authorization user device 120 to the authentication server 110 in a cyphered manner, together with an encryption key shared between the authentication mobile application $120_{APP}$ and the authentication server 110.

Upon decrypting the access credentials (action node 260), the authentication server 110 preferably sends the decrypted access credentials and, preferably, the OTP password to the web server 105 (action node 265)—in case of negative authorization outcome, instead, no access credentials are sent from the authorization user device 120 to the authentication server 110 and to the web server 105, in which case the indication of the negative authorization outcome is sent from the authentication server 110 to the web server 105, preferably together with the OTP password (for the same purposes discussed above of matching the login request to the denied authorization). As conceptually illustrated in the figure, the reception at the web server 105 of the decrypted access credentials and of the OTP password, or of the OTP password and of the negative authorization outcome allows exiting the loop between the decision nodes 220 and 230 (in fact, the exit branch Y of the decision node 230 is enabled).

Assuming a positive authorization outcome, the web server 105 is in its turn configured to perform the automatic login to the restricted access area of the web page $105_{WP}$ based on the access credentials made available by the authorization user device 120—action node 275. Preferably, as herein exemplary considered, the web server 105 is configured to perform the automatic login to the restricted access area of the web page $105_{WP}$ also based on said OTP password; even more preferably, the web server 105 is configured to perform the automatic login to the restricted access area of the web page $105_{WP}$ based on a matching between the OTP password received at the web server 105 from the requesting user device 115 (see action node 215) and the OTP password received at the web server 105 from the authentication server 110 (see action nodes 235 and 265).

If (exit branch Y of the decision node 270) the OTP password received at the web server 105 from the requesting user device 115 matches the OTP password received at the web server 105 from the authentication server 110, then the automatic login is performed (action node 275) in the restricted access area of the web page $105_{WP}$ as indicated by the login request identified by the OTP password; otherwise, exit branch N of the decision node 270, the authorization procedure 200 ends (action node 225) and, preferably, a corresponding error is displayed on the requesting user device 115).

Thanks to the proposed authorization procedure 200, the user is relieved from the burden of having to remember long, complex and low-duration access credentials to access a restricted access area of a web page or of a service, which makes the proposed authentication procedure 200 adapted to be implemented in any new or existing service requiring authentication. For example, the proposed authentication procedure 200 may be integrated in two-phases authentication currently used for internet banking services.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply system has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

The invention claimed is:

1. A method for authorizing automatic login of a user to a reserved area of an information resource delivered by a web server, the method comprising:
    at a first user device, through a software application installed and running in the first user device, connecting to the web server for retrieving the information resource, sending to an authentication server an identifier of the information resource and an identifier of the user, and sending to the web server a provisional password identifying a login request to the reserved area of the information resource, the provisional password being a one-time-password valid for only one login session;
    at the authentication server, based on said identifier of the information resource and on said identifier of the user, sending to a second user device an authorization request for authorizing the automatic login, the second user device being associated with the user and storing access credentials for logging in said reserved area of the information resource;
    at the second user device, notifying to the user the authorization request, and upon confirmation of the authorization request by the user on the second user device, making available to the web server the access credentials stored in the second user device, and
    at the web server, performing the automatic login to the reserved area of the information resource based on the access credentials made available by the second user device.

2. The method according to claim 1, wherein said making available to the web server the access credentials stored in the second user device comprises:
- at the second user device, sending the access credentials stored thereat to the authentication server, and
- at the authentication server, receiving the access credentials from the second user device and sending the received access credentials to the web server.

3. The method according to claim 2, wherein said sending to an authentication server an identifier of the information resource and an identifier of the user comprises sending to the authentication server also said provisional password, and wherein said making available to the web server the access credentials comprises sending to the web server also said provisional password, said performing the automatic login to the reserved area of the information resource being also based on said provisional password.

4. The method according to claim 3, wherein said performing the automatic login to the reserved area of the information resource is based on a matching between the provisional password received at the web server from the first user device and the provisional password received at the web server from the authentication server.

5. The method according to claim 3, wherein the access credentials are encrypted access credentials, and wherein said sending to the authentication server the access credentials comprises sending to the authentication server the encrypted access credentials together with an encryption key shared between the second user device and the authentication server, and wherein said sending the access credentials and the provisional password to the web server comprises decrypting the encrypted access credentials and sending the decrypted access credentials and the provisional password to the web server.

6. The method according to claim 3, wherein upon reception at the web server of the provisional password identifying the login request to the reserved area of the information resource, the web server is configured to put the information resource on hold for a predetermined time period, waiting for receiving the access credentials, and to make the information resource not available after said predetermined time period is elapsed without receiving the access credentials.

7. The method according to claim 1, wherein the second user device comprises at least one mobile device, such as a smartphone, a tablet, a wearable smart device, adapted to run software applications, and wherein said sending to a second user device an authorization request and said notifying to the user the authorization request are carried out through an authorization software application installed in the mobile device and associated with the information resource.

8. The method according to claim 1, further comprising registering the user to the authentication server.

9. The method according to claim 1, further comprising, at the second user device:
- installing the authorization mobile application;
- logging in to the authentication server through the authorization mobile application;
- acquiring the access credentials, and
- storing the acquired access credentials in the second user device.

10. The method according to claim 8, further comprising, at the first user device:
- installing a plugin software component associated with said software application;
- logging in to the authentication server through said plugin software component and determining the identifier of the user, and
- storing in the plugin software component the identifier of the user;
- wherein the method further comprises, after said connecting to the web server for retrieving the information resource, running the plugin software component associated with said software application, said sending to an authentication server an identifier of the information resource and an identifier of the user being carried out through said plugin software component.

11. A system for authorizing automatic login of a user to a reserved area of an information resource, the system comprising:
- a web server;
- an authentication server;
- a first user device configured to connect, through a software application installed and running in the first user device, to the web server for retrieving the information resource, to send to the authentication server an identifier of the information resource and an identifier of the user, and to send to the web server a provisional password identifying a login request to the reserved area of the information resource, the provisional password being a one-time-password valid for only one login session;
- a second user device associated with the user and storing access credentials for logging in said reserved area of the information resource,
- wherein the authentication server is configured to send, based on said identifier of the information resource and on said identifier of the user, an authorization request to the second user device for authorizing the automatic login,
- wherein the second user device is configured to notify to the user the authorization request, and upon confirmation of the authorization request by the user on the second user device, to make available to the web server the access credentials stored in the second user device, and wherein
- the web server is configured to perform the automatic login to the reserved area of the information resource based on the access credentials made available by the second user device.

* * * * *